Aug. 15, 1933. J. L. MAULL 1,922,773
FRUIT JUICE EXTRACTOR
Filed Sept. 27, 1932
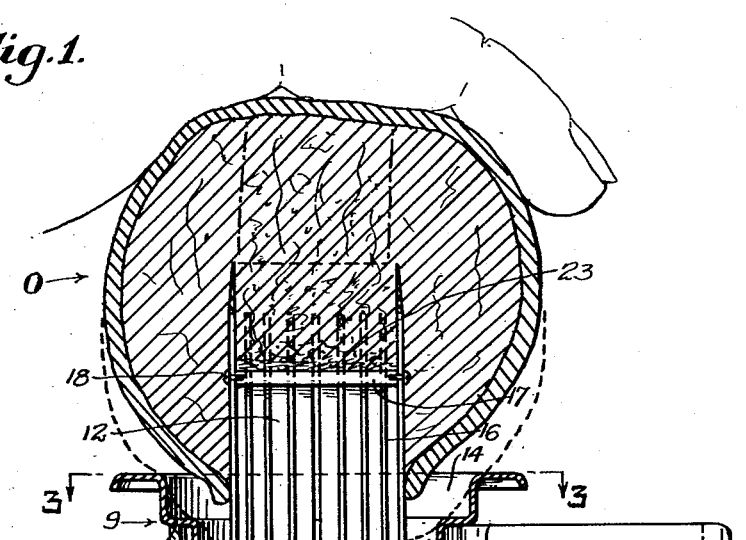
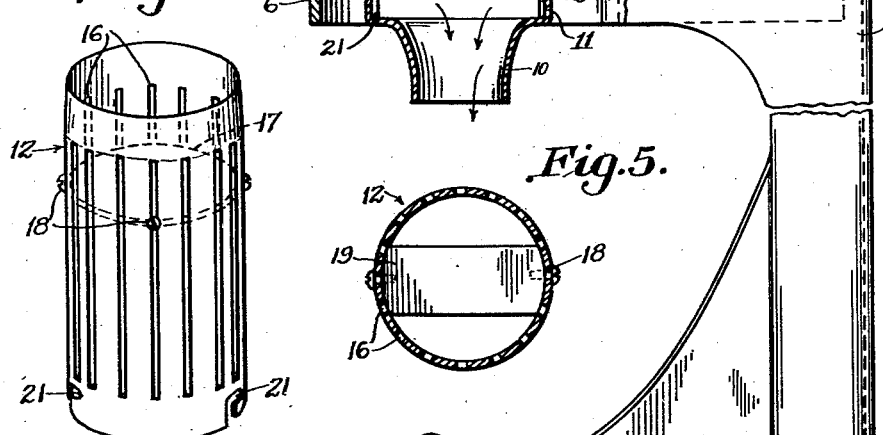
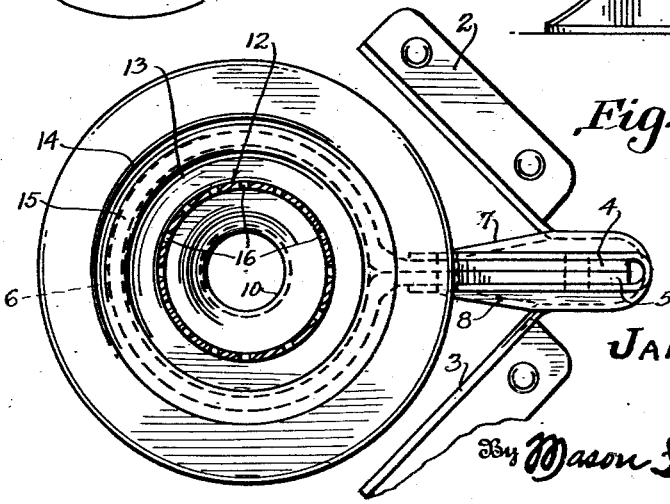
Inventor
JAMES L. MAULL
By Mason Fenwick & Lawrence
Attorneys Patented Aug. 15, 1933

1,922,773

UNITED STATES PATENT OFFICE 1,922,773

FRUIT JUICE EXTRACTOR

James L. Maull, Orlando, Fla.

Application September 27, 1932
Serial No. 635,113

5 Claims. (Cl. 100—49)

The invention forming the subject matter of this application is an improvement on the invention disclosed in my prior application, Serial No. 526,067, filed March 28, 1931 for Fruit juice extracting apparatus. The subject matter common to the two applications comprises a cylindrical tube having a stop intermediate its ends and having its periphery provided with apertures, and adapted to have one end secured in a cup designed to form a seat for an orange or similar fruit.

The main object of the present invention is to provide a device of this character which can be very cheaply manufactured and which can be very readily operated to extract juice free of pulp and seeds from an orange or similar fruit.

Other objects of the invention will become apparent as the detailed description thereof proceeds.

In the drawing:

Figure 1 is a central vertical section through the juice extractor shown as supported by a suitable stand;

Figure 2 is a perspective view of a cutting cylinder forming the main part of this invention;

Figure 3 is a horizontal section taken on the line 3—3 of Figure 1;

Figure 4 is a fragmentary vertical section illustrating a modified form of the invention; and Figure 5 is a plan view of a modified form of cylinder which may be used as one of the elements of this invention.

As shown in the drawing, the device comprises a standard 1 substantially U-shaped in cross section and provided at its lower end with base members 2 and 3 adapted to support the standard in substantially vertical position on a suitable support. The upper end of the standard 1 is shaped to receive the lugs 4 and 5 which project radially from a circular band 6. The lugs 4 and 5 contact with each other throughout their length and are suitably riveted or otherwise secured between furcations 7 and 8 formed at the upper end of the standard 1 and spaced apart a sufficient distance to embrace the lugs 4 and 5.

The band 6 is intended to form a seat for a cup-shaped member 9 which is preferably stamped out of sheet metal to form a spout 10 concentric with an annular recess 11 adapted to receive detachably the lower end of a juice extracting cylinder 12. The cup 9 is further provided with somewhat wider annular recesses 13 and 14 to form a chamber for receiving the juice extracted from an orange 0 positioned on a cutting cylinder 12. The recesses 13 and 14 are connected by an annular flange 15 which is adapted to seat on the upper edge of the band 6 for the purpose of supporting the device properly over any suitable container positioned below the spout 10.

The cylinder 12 is provided with a number of slots 16 extending through the greater part of its length and narrow enough to prevent pulp and seeds from passing therethrough to the interior of the cylinder. A stop member 17 is secured for axial adjustment in the cylinder 12; and for this purpose of adjustment is provided with diametrically opposite tapped apertures to receive the clamping screws 18. Any number of these screws 18 may be used for the purpose of clamping the stop member 17 in any desired position within the cylinder 12. The tapped apertures are selected as to position so that the shanks of the screws 18 pass through some of the slots 16 formed in the cylinder 12.

The stop member 17 may be in the form of a blank disk, as shown in Figure 1, or in the form of a strip 19 extending diametrically across the cylinder 12, as shown in Figure 5, and suitably secured by screws 18 passing through some of the slots 16 in the cylinder 12. Adjustability of the stop member 17 may be secured otherwise than by use of the set screws 18. For example, the inner periphery of the cylinder 12 may be provided with annular notches 20 somewhat as shown in Figure 4 of the drawing and adapted to receive the slightly beveled edge of the stop member 17 or the correspondingly beveled ends of the strip 19.

The lower end of the cylinder 12 is provided with bayonet slots 21 designed to cooperate with inwardly projecting lugs 22 formed in the recess 11 of the cup-shaped member 9. This detachable connection is preferred in order that the parts may be separated for cleaning when desired; and also to prevent the cylinder being withdrawn from the cup-shaped member 9 by upward pull of the fruit after a juice extracting operation.

The device illustrated in this application is intended to be used somewhat as illustrated in Figure 1 of the drawing. The stop member 17 is located preferably above the center of the cylinder; and must always be located so that part of the slots 16, or other suitable apertures, are below the lower face of the said stop 17. The upper edge of the cylinder 12 is beveled to a cutting edge or is made of material so thin and rigid that it is not necessary to bevel this edge for cutting purposes.

In the actual operation of the device, the orange or similar fruit is preferably presented to the cutting edge of the cylinder 12 so that its core is about coaxial within the axis of the cylinder. Pressure applied to the upper end of the orange causes the cutting edge of the cylinder to cut out the disk 23 of skin. Further pressure on the upper end of the orange moves it downwardly along the cylinder 12 until the disk 23 is stopped by contact with the upper face of the stop member 17 or 19 as the case may be. Continued movement of the orange toward the cup member 9 compresses the column of core and pulp, supported by the stop member 17, and forces the juice from this column outwardly and around the cylinder 12, while the core and seeds are retained within this column and within the orange. The orange being pressed down until its surface contacts with the upper edge of the recess 14 is then squeezed in all directions against the periphery of the cylinder 12 until substantially all of the orange juice is extracted from the orange and, flowing through the slots 16, passes through the spout 10 into any container which may be placed below the same.

After extraction of the juice, the orange when removed from the instrument will be found to retain all the pulp, seeds and core so that nothing but the clear strained orange juice has been extracted and passed through the spout 10. This method of juice extraction presents a very decided advantage over methods heretofore in use, inasmuch as all waste matter is retained within the orange skin and may be disposed of bodily and in a sanitary manner.

While I have shown the cup-shaped part of this apparatus as supported by a particular type of supporting standard, it is to be understood that the member 9 may be positioned on the upper edges of glasses and similar containers so that the juice from the orange may be projected directly into the cups or containers supporting the device. The several recesses and flanges formed in the operation of stamping out the cup-shaped member 9 adapt the device for use on containers of different sizes.

It will be readily understood that the stop member 17 may be made concave or convex or of any desired shape, but it will be apparent that providing it with apertures or slots can have no effect upon its operation, since the disk 23 of the fruit would close these apertures or slots and prevent passage of juice therethrough.

The stop member 17 may be located in accordance with the various sizes of fruit with which it is used and from which juice is being extracted. It is immaterial whether this stop member be formed in one piece or in a number of pieces, or in the form of any network fixed across the cylinder. Its primary function is to act as a stop only and to compress the column of the fruit so as to extract the juice from the column. It is obvious that the juice from fruit of the orange type may be readily extracted by presenting any part of the orange to the cylindrical cutting member; but it is most effectively used when the core axis is made to align substantially with the axis of the cutting cylinder.

What I claim is:

1. In a fruit juice extractor a support having an aperture therethrough, an open ended tube having one end seated on said support and surrounding said aperture, said tube having its periphery provided with apertures, a stop extending across and adjustable lengthwise of said tube, and means for clamping said stop in adjusted position in said tube with a portion of each of said apertures on opposite sides of said stop.

2. In a fruit juice extractor a support having an aperture therethrough, an open ended tube having one end seated on said support and surrounding said aperture, said tube having slots in its periphery extending substantially parallel to the axis thereof, a stop adjustable in said tube between the ends of said slots, and means extending through two of said slots for clamping said stop in adjusted position in said tube.

3. In a fruit juice extractor, a cup shaped support having an aperture therethrough and having annular recesses formed therein concentric with said aperture, a cylinder having slots extending lengthwise thereof and seated in the innermost recess, said recess and cylinder being provided with cooperative locking means for detachably securing the cylinder to said support, a stop adjustable lengthwise in said cylinder, and means for clamping said stop in adjusted position between the ends of said slots.

4. In a device for extracting juice from oranges and similar fruit, a tube, and a stop secured transversely across said tube between the ends thereof, said tube being provided with apertures through the wall thereof and at one side of said stop.

5. The method of extracting juice from oranges and similar fruit which consists in cutting from the skin thereof at the stem or blossom end, a disk of skin centered around the axis of the fruit core, then forcing said disk into the fruit in the direction of said axis to compress the core and seeds surrounding the same in a column within the fruit, then compressing the fruit around said column to force the juice due to such compression through the opening in the skin formed by the forcing of said disk into the fruit.

JAMES L. MAULL.